(12) United States Patent
Phipps (10) Patent No.: US 9,260,613 B2
(45) Date of Patent: Feb. 16, 2016

(54) CLEAR COATING COMPOSITIONS COMPRISING PARTICULATE INORGANIC MINERAL

(75) Inventor: Jonathan Stuart Phipps, Gorran Haven (GB)

(73) Assignee: Imerys Minerals Limited, Par Cornwall (GB)

( * ) Notice: Subject to any disclaimer, the term of this patent is extended or adjusted under 35 U.S.C. 154(b) by 206 days.

(21) Appl. No.: 13/384,045

(22) PCT Filed: Jul. 14, 2010

(86) PCT No.: PCT/GB2010/051152
§ 371 (c)(1),
(2), (4) Date: Feb. 23, 2012

(87) PCT Pub. No.: WO2011/007171
PCT Pub. Date: Jan. 20, 2011

(65) Prior Publication Data
US 2012/0141778 A1 Jun. 7, 2012

(30) Foreign Application Priority Data

Jul. 14, 2009 (GB) .................................. 0912201.1

(51) Int. Cl.
| | |
|---|---|
| C09D 7/12 | (2006.01) |
| C09D 1/00 | (2006.01) |
| B05D 7/24 | (2006.01) |
| B32B 18/00 | (2006.01) |
| B05D 3/00 | (2006.01) |
| C08K 3/34 | (2006.01) |
| B32B 33/00 | (2006.01) |
| C09D 7/00 | (2006.01) |
| C09D 15/00 | (2006.01) |

(52) U.S. Cl.
CPC .............. C09D 7/1216 (2013.01); C09D 7/005 (2013.01); C09D 15/00 (2013.01); C08K 3/34 (2013.01); *Y10T 428/252* (2015.01); *Y10T 428/2982* (2015.01)

(58) Field of Classification Search
None
See application file for complete search history.

(56) References Cited

U.S. PATENT DOCUMENTS

| | | | |
|---|---|---|---|
| 3,472,459 | A | 10/1969 | Pfeifer et al. |
| 3,538,038 | A | 11/1970 | Blanc et al. |
| 3,755,222 | A | 8/1973 | Gruber et al. |
| 3,932,194 | A | 1/1976 | Lamar et al. |
| 3,966,572 | A | 6/1976 | Carder |

(Continued)

FOREIGN PATENT DOCUMENTS

| | | |
|---|---|---|
| EP | 0 012 290 A1 | 6/1980 |
| EP | 0 160 723 B1 | 8/1988 |

(Continued)

OTHER PUBLICATIONS

Examination Report for related European Patent Application No. 10737616.2, dated Jan. 2, 2013.

(Continued)

*Primary Examiner* — Alexandre Ferre
(74) *Attorney, Agent, or Firm* — Finnegan, Henderson, Farabow, Garrett & Dunner, L.L.P.

(57) ABSTRACT

The present invention describes clear coating compositions comprising a particulate inorganic mineral, wherein the $d_{50}$ of the particulate inorganic mineral is less than about 1 μm, and wherein the mineral includes a kandite clay.

33 Claims, 2 Drawing Sheets

(56) References Cited

U.S. PATENT DOCUMENTS

| | | | |
|---|---|---|---|
| 4,179,537 | A | 12/1979 | Rykowski |
| 4,251,427 | A | 2/1981 | Recker et al. |
| RE30,699 | E | 8/1981 | Iannicelli |
| 4,318,959 | A | 3/1982 | Evans et al. |
| 4,419,406 | A | 12/1983 | Isobe et al. |
| 4,436,862 | A | 3/1984 | Tetenbaum et al. |
| 4,460,737 | A | 7/1984 | Evans et al. |
| 4,482,538 | A | 11/1984 | Davies |
| 5,076,959 | A | 12/1991 | Barker et al. |
| 5,109,039 | A | 4/1992 | Eisner |
| 5,112,877 | A | 5/1992 | Barker et al. |
| 5,166,255 | A | 11/1992 | Anderson, Jr. et al. |
| 5,168,105 | A | 12/1992 | Anderson, Jr. et al. |
| 5,199,980 | A | 4/1993 | Lynch et al. |
| 5,314,535 | A | 5/1994 | Lynch et al. |
| 5,318,619 | A | 6/1994 | Lynch et al. |
| 5,346,761 | A | 9/1994 | Roller et al. |
| 5,358,562 | A | 10/1994 | Nae et al. |
| 5,433,956 | A | 7/1995 | Patel |
| 5,437,719 | A | 8/1995 | Lynch et al. |
| 5,480,480 | A | 1/1996 | Lynch et al. |
| 5,484,832 | A | 1/1996 | Garrett et al. |
| 5,693,696 | A | 12/1997 | Garrett et al. |
| 5,766,097 | A | 6/1998 | Horiuchi et al. |
| 5,846,309 | A | 12/1998 | Freeman et al. |
| 5,858,603 | A | 1/1999 | Becker et al. |
| 5,967,906 | A | 10/1999 | Horiuchi et al. |
| 6,145,765 | A | 11/2000 | Capelle, Jr. et al. |
| 6,426,135 | B1 | 7/2002 | Kotani et al. |
| 6,585,822 | B2* | 7/2003 | Berube et al. .............. 428/32.34 |
| 2003/0162874 | A1 | 8/2003 | Redford et al. |
| 2003/0186067 | A1 | 10/2003 | Redford et al. |
| 2004/0157025 | A1 | 8/2004 | Knauf |
| 2005/0084622 | A1* | 4/2005 | Houghtaling et al. ......... 428/1.1 |
| 2006/0063911 | A1 | 3/2006 | Cayton et al. |
| 2006/0249270 | A1* | 11/2006 | Alves et al. ................ 162/181.8 |
| 2007/0135588 | A1 | 6/2007 | Diakoumakos et al. |
| 2007/0197709 | A1 | 8/2007 | Kim et al. |
| 2007/0213445 | A1 | 9/2007 | Klijn et al. |
| 2007/0249754 | A1 | 10/2007 | Lyu et al. |
| 2007/0265384 | A1 | 11/2007 | Ramotowski |

FOREIGN PATENT DOCUMENTS

| | | |
|---|---|---|
| EP | 0 292 316 A2 | 11/1988 |
| EP | 0 310 916 A2 | 4/1989 |
| EP | 0 172 269 B1 | 6/1989 |
| EP | 0 691 336 A1 | 1/1996 |
| EP | 0 595 844 B1 | 3/1997 |
| EP | 0 468 293 B1 | 9/1997 |
| EP | 0 525 795 B1 | 10/1997 |
| EP | 0 698 067 B1 | 10/1998 |
| EP | 0 701 591 B1 | 10/1998 |
| EP | 0 813 858 B1 | 11/1998 |
| EP | 0 619 182 B1 | 3/1999 |
| EP | 0 599 675 B2 | 8/1999 |
| EP | 0 742 486 B1 | 12/1999 |
| EP | 0 756 297 B1 | 11/2000 |
| EP | 0 907 771 B1 | 2/2003 |
| EP | 1 180 436 B1 | 10/2005 |
| EP | 1 431 457 B1 | 3/2007 |
| EP | 1 676 941 B1 | 8/2008 |
| EP | 1 570 012 B1 | 10/2008 |
| EP | 2 172 425 A1 | 4/2010 |
| JP | 60-092829 A | 5/1985 |
| JP | 61-190577 | 8/1986 |
| JP | 61-190577 | 8/1986 |
| JP | 09-067179 A | 3/1997 |
| JP | 2001-081407 A | 3/2001 |
| JP | 2002-192679 A | 7/2002 |
| JP | 2006-045367 A | 2/2006 |
| RU | 2 286 367 C1 | 10/2006 |
| WO | WO 94/26532 | 11/1994 |
| WO | WO 2005/021168 A1 | 3/2005 |
| WO | WO 2006/076012 A2 | 7/2006 |
| WO | WO 2006/100397 A1 | 9/2006 |
| WO | WO 2008/010610 A1 | 1/2008 |
| WO | WO 2008/070517 A1 | 6/2008 |
| WO | WO 2008/156032 A1 | 12/2008 |
| WO | WO 2011-007171 A1 | 1/2011 |

OTHER PUBLICATIONS

Written Opinion of the International Searching Authority dated Sep. 27, 2010, in International Application No. PCT/GB2010/051152, filed Jul. 14, 2010.

Search Report issued by UK Intellectual Property Office, dated Nov. 11, 2009, in related UK Application No. GB0912201.1.

International Preliminary Report on Patentability issued Oct. 27, 2011, in International Application No. PCT/GB2010/051152.

* cited by examiner

CLEAR COATING COMPOSITIONS COMPRISING PARTICULATE INORGANIC MINERAL

This application is a U.S. national stage entry under 35 U.S.C. §371 from PCT International Application No. PCT/GB2010/051152, filed Jul. 14, 2010, and claims priority to and the benefit of the filing date of GB Application No. 0912201.1, filed Jul. 14, 2009, the subject matter of both of which is incorporated herein by reference.

FIELD OF THE INVENTION

This invention relates to clear coating compositions and methods for making said compositions. This invention also relates to the use of the clear coating compositions for coating articles, said coated articles and films formed from the clear coating compositions.

BACKGROUND OF THE INVENTION

Many types of protective coatings are routinely applied to industrial and consumer goods and materials. Examples include coil coatings for metals, wood coatings for furniture, flooring and joinery and highly transparent glossy topcoats for automobiles. Such coatings are used to protect the underlying substrate from damage caused by impacts, scratching, moisture, light and other environmental factors to which the surface is exposed. The coatings are hard in order to resist scratching and impact damage and they commonly consist of highly crosslinked thermoset polymers. Traditionally, hardness is achieved by using a polymer possessing a stiff polymer chain and a high degree of cross-linking. However, the incorporation of this type of polymer may lead to coatings which are brittle and prone to cracking and flaking. Recent interest has focussed on the incorporation of inorganic particles possessing a median diameter of less than about 50 nm in order to improve the scratch and abrasion resistance of coatings. It is generally considered that such particles need to possess median diameters of 100 nm or less in order to impart the required properties and retain acceptable levels of transparency.

Mineral fillers are frequently added to opaque and pigmented coatings but not to transparent protective coatings. In opaque and pigmented coatings, their role is to increase the opacifying efficiency of $TiO_2$ pigment particles by spacing them out, and, in some cases, to help opacify the coating by generating light scattering of their own.

It is also known to combine mineral fillers with polymers to modify the mechanical properties. However, retaining transparency is traditionally not of importance for these applications and therefore the effect of the filler on the transparency is of minimal concern. More recently, the use of nanoclay fillers in polymers has received attention primarily because it has been shown to be possible to achieve comparable stiffness at significantly lower addition levels than with conventional micron sized mineral filler particles. However, these nanoclay fillers are based on montmorillonite clays which are a type of swelling clay mineral. Montmorillonite clays require complete delamination, exfoliation and surface coating before use and must remain fully dispersed in the polymer in order to deliver these benefits. The requirement for complete surface coating makes nanoclays generally more expensive than the polymers in which they are used and adequate dispersion is rarely achieved using conventional mixing and compounding equipment.

There is a continued need for clear coatings, which may also be referred to as clear film forming compositions, which possess good mechanical properties. However, in providing acceptable (or preferably improved) mechanical properties then optical properties such as the degree of transparency should not be compromised to a significant degree such, for example, that the composition is not substantially transparent.

The present invention is based, inter alia, on the surprising finding that a range of particulate inorganic minerals, for example, non-swelling clay minerals such as kandite clays, talc and other minerals such as mica, silica, perlite and diatomaceous earth (DE) may be used in clear coatings and provide a combination of good mechanical and optical properties.

SUMMARY OF THE INVENTION

According to the present invention, in a first aspect, there is provided a clear coating composition comprising a particulate inorganic mineral.

The mineral may be a non swelling clay mineral such as kandite clay including at least one of halloysite, kaolin or ball clay or the non swelling clay mineral may be talc. Non swelling clay minerals for use in the present invention do not swell in the presence of water alone. Other suitable minerals include perlite, mica, silica and diatomaceous earth. As such, there is provided a clear coating composition comprising a particulate kandite clay. There is also provided a clear coating composition comprising at least one of: particulate halloysite, mica, talc, kaolin, perlite, diatomaceous earth or silica. Optionally, the particulate inorganic mineral is not an organomineral or organoclay.

Organominerals and organoclays are minerals or clays which have been organically modified by exchanging original interlayer cations with organocations, (for example onium ions, for example quaternary alkyl ammonium ions).

The clear coating composition according to the first aspect of the invention may be used to coat an article and according to second and third aspects of the present invention there is provided: a method for coating an article comprising coating said article with the clear coating composition according to the first aspect of the invention; and an article coated with the clear coating composition. In the method, the clear coating composition may be cured, for example by evaporation of a solvent or it may be UV cured or by coming into contact with moisture.

According to a further aspect of the present invention, there is provided a production process for said clear coating composition according to the first aspect of the present invention, comprising blending said mineral and other components of the clear coating composition.

There are numerous advantages associated with the present invention. Use of the particulate inorganic minerals in accordance with the present invention provides coatings with good mechanical properties whilst surprisingly having a minimal, or small, effect on the optical properties of the coatings, such as the transparency. There is also no, or minimal, reduction in the tensile elongation at failure when compared with commercially available coatings. Minerals for use in accordance with the present invention do not need to be exfoliated and are relatively easy to disperse in the coatings and are of low cost. Delamination and/or deaggregation of minerals for use in the clear coating compositions in accordance with the present invention may be achieved solely by the use of mechanical means, for example grinding and/or milling. The clear coating compositions in accordance with the present invention may, optionally, be solvent-free and aqueous-based. Further, the particulate inorganic minerals in accordance with the present invention are suitable for use in a coating composition wherein the clear coating composition may be suitable for use as a clear primer composition, a clear sealer composition or a clear top coat composition. Said compositions possess good mechanical and optical properties.

DETAILED DESCRIPTION OF THE INVENTION

Clear Coating Composition

The clear coating composition may include lacquers, varnishes, paints and other products and will typically be suitable for application by spraying and/or brushing. During and/or after coating, the composition may be cured by evaporation of the solvent or it may be UV cured. Curing may also be achieved by the composition coming into contact with moisture. The composition may comprise part of a so-called single component system or a so-called two component system (sometimes referred to as a 2K system). A suitable example of a so-called 2K system is a 2K polyurethane system which typically comprises a polyol resin and an isocyanate crosslinker. The polyol is typically a relatively low molecular weight polymer which contains many OH groups. The isocyanate is a molecule containing two or more NCO groups which react with the OH groups on the polyol to make urethane linkages. A single component system, for example a 1K polyurethane system, comprises a blocked isocyanate in which the NCO groups are reacted with a blocking agent which prevents the reaction with the polyol. Application of heat decomposes the blocking agent to liberate the free NCO which is then free to react.

The clear coating composition may be aqueous based or non-aqueous based. For example, the clear coating composition may comprise a suitable non-aqueous solvent or reactive diluent. A reactive diluent participates in the curing process and forms a part of the resultant coating.

The clear coating composition, in addition to the mineral, may comprise a polymer precursor such as a resin, e.g. a polymer resin or an oligomer resin. A suitable example of a polymer precursor is a urethane acrylate, for example the Desmolux range of aliphatic urethane acrylates, for example Desmolux U100 or Desmolux U680H which are unsaturated aliphatic urethane acrylates. Typically, the polymer resin will be capable of forming a thermoset polymer, though polymers other than thermoset polymers may also be suitable such as non-drying alkyd polymers. The polymer precursor may be a reactive diluent or monomer.

In addition to at least one polymer precursor or polymer resin, the clear coating composition may comprise one or more of: a cross linker, a dispersant, and a photoinitiator. Suitable further components comprise slip or levelling agents which affect the surface tension and adhesion of the coating, adhesion promoters, wetting agents, light stabilisers and UV absorbers which assist in protecting against UV damage later in the life of the coating. The composition may comprise different dispersants in order to disperse the particulate mineral and to disperse the polymer precursor, e.g. polymer resin. The dispersant may be present in an amount of about 0.1 wt % to about 10 wt % based on the dry weight of the mineral, for example about 1 wt % to about 7.5 wt %.

Methods for making the clear coating composition will be apparent to the skilled person. For example, a dispersant and reactive diluent (or monomer) may be combined followed by mixing with a dry milled mineral to make a high solids dispersion. The dispersion may then be combined with a suitable resin and an initiator mixed in. In alternative embodiments, the mineral may be precoated with a dispersant. Preferably, the dispersant surface coats the mineral so that effective dispersion is achieved while the coating composition is still in liquid form. The dispersant may participate in the crosslinking reaction and assist in bonding the mineral into the coating.

Polymer Resin

The polymer resin may be suitable for forming a homopolymer or a copolymer. Suitable examples comprise polyacrylates, polyesters, polyamides, polyurethanes, polyimides, polyurea, polyethers, polysilicones, fatty acid esters, as well as amine, alcohol, acid, ketone, ester, fluorinated, and aromatic functionalized versions of these polymer resins and physical blends and copolymers of the same. Polymer resins with respect to the total weight of the coating composition may be present in an amount between about 10 wt % and about 80 wt %.

Particulate Inorganic Mineral

The inorganic particulate mineral may, for example, be selected from a clay mineral such as kaolin, talc or ball clay or a calcined clay such as metakaolin or fully calcined kaolin. The kaolin may be hydrous kaolin. The inorganic particulate mineral may also be selected from mica, perlite, diatomaceous earth (DE) and silica. Optionally, the mineral may not mainly comprise or consist essentially of or consist of a swellable clay mineral, for example the mineral may not mainly comprise or consist essentially of or consist of a montmorillonite clay mineral. Optionally, the mineral may comprise mainly an inorganic particulate mineral other than a swellable clay mineral. The optionally excluded montmorillonite clay may have been organically modified by exchanging original interlayer cations with organocations, (for example onium ions or for example quaternary alkyl ammonium ions).

The mineral for use in the coating compositions of the present invention may be a non-swelling clay mineral. Non-swelling clay minerals suitable for use in the present invention include kandite clay, for example at least one of halloysite, kaolin or ball clay. Other suitable non-swelling clays include talc. The non-swelling clays for use in the present invention are not swellable in water alone. Advantageously, delamination and/or deaggregation of the clay may be achieved through mechanical means such as grinding and/or milling and in the absence of swelling.

The mineral, e.g. clay mineral for use in preparing the coating composition may be prepared by light comminution, e.g. grinding or milling, of a coarse kaolin to give suitable delamination thereof. The comminution may be carried out by use of beads or granules of a plastic, e.g. nylon, grinding or milling aid. Ceramic media, silica or sand may also be used. In order to improve the dispersion of the mineral in the polymer resin, jet-milling or fluid energy milling may be used; see U.S. Pat. No. 6,145,765 and U.S. Pat. No. 3,932,194, the contents of which are incorporated herein in their entirety by reference, for more details. The coarse mineral may be refined to remove impurities and improve physical properties using well-known procedures. The mineral may be treated by a known particle size classification procedure, e.g. screening and/or centrifuging, to obtain particles having a desired $d_{50}$ value and/or steepness.

Following comminution, e.g. grinding, the mineral may have a $d_{50}$ in the range of about 0.15 μm to about 5 μm as measured according to the Sedigraph method. In order to provide a combination of strength, good clarity and low haze, then $d_{50}$ may be less than about 1 μm [1 μm], for example less than about 0.6 μm [0.5 μm], for example less than about 0.5 μm [0.4 μm], for example less than about 0.4 μm [0.3 μm] as measured according to the Sedigraph method (values according to the disc centrifuge method are indicated in brackets). As such, the mineral may have a $d_{50}$ (Sedigraph) ranging from about 0.15 μm to about 0.6 μm or ranging from about 0.15 μm to less than 0.6 μm, for example ranging from about 0.15 μm to about 0.5 μm or ranging from 0.15 μm to less than 0.5 μm, for example ranging from about 0.15 μm to about 0.4 μm or ranging from 0.15 μm to less than 0.4 μm. The clear coating compositions for use in the present invention are suitable for matt compositions and gloss compositions. For matt compositions, the particulate inorganic mineral may be coarser. For example, $d_{50}$ may be greater than about 2 μm, for example greater than about 3 μm (Sedigraph). Suitably, the matt composition may have a gloss (60°)<90 measured in accordance with ASTM D523. For example, the matt composition may have a gloss (60°)<80, for example <70, for example <60, for example <50, for example <40, for example <30, for example <20, all measured in accordance with ASTM D523. Suitably, the matt composition may have a gloss (60°)>5, for example >10 measured in accordance with ASTM D523. Effective matting effects can be obtained by using significant quantities of the particulate inorganic mineral in the clear coating composition while maintaining good viscosity. For example, at about 10 wt % loading levels of the particulate inorganic mineral, the viscosity is typically only increased by about 20% compared to when the particulate inorganic mineral is not present.

Advantageously, the range of fine content of mineral, i.e. the wt % less than 0.1 μm as measured according to the disc centrifuge method may be 50 wt % or less, for example 40 wt % or less, for example 20 wt % or less, for example 10 wt % or less, for example 5 wt % or less, for example 4 wt % or less, for example less than 1 wt %. Advantageously, the range of fine content of mineral, i.e. the wt % less than 0.1 μm as measured according to the Sedigraph method may be 25 wt % or less, for example less than 5 wt %. The wt % of particulate inorganic mineral less than 0.1 μm as measured according to the disc centrifuge method may be at least about 0.1 wt % or may be at least about 1 wt %. The wt % less than 0.1 μm as measured according to the disc centrifuge method may range from about 0.1 wt % to about 25 wt %, for example from about 0.1 wt % to about 20 wt %, for example from about 0.1 wt % to about 5 wt %, for example from about 0.1 wt % to about 1 wt %. The wt % less than 0.1 μm as measured according to the disc centrifuge method may range from about 1 wt % to about 25 wt %, for example from about 1 wt % to about 20 wt %, for example from about 1 wt % to about 5 wt %.

The median equivalent particle diameter ($d_{50}$ value) and other particle size properties referred to herein for the particulate mineral are as measured in a well known manner by one of two methods. One method involves measurement in a well known manner by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (esd), less than given esd values. The median particle size $d_{50}$ is the value determined in this way of the particle esd at which there are 50% by weight of the particles which have an equivalent spherical diameter less than that $d_{50}$ value. A further method involves measurement by sedimentation using a disc centrifuge device. The CPS disc centrifuge (supplied by CPS Instruments, Mechelaarstaraat 17, 4903 RE Oosterhout, The Netherlands, telephone +31 162 472478; web-site: www.cpsinstruments.eu) uses a centrifugal field to amplify the sedimentation rate and eliminate interference of Brownian motion in the measurement.

The mineral may have an aspect ratio of greater than about 10 or, for example, greater than about 30. The mineral may have an aspect ratio ranging from about 10 or greater than about 10 to about 70, for example about 20 to about 50. Aspect ratios are calculated by the Sphericity Model from experimentally determined (using electron microscopy) surface area data as described in U.S. Pat. No. 5,846,309 the contents of which are hereby incorporated in their entirety by reference. For those embodiments of the invention wherein the mineral is silica then the particles may be essentially spherical. For those embodiments of the invention wherein the mineral is a calcined kaolin then the aspect ratio may typically be lower than the values mentioned above.

The particulate inorganic mineral may have a particle size distribution steepness factor of about 20 to about 75. The steepness factor is defined as the ratio of the $d_{30}$ (Sedigraph) equivalent spherical diameter (at which 30% by weight of the particles are finer) to the $d_{70}$ (Sedigraph) equivalent spherical diameter (at which 70% by weight of the particles are finer), multiplied by 100 ($d_{30}/d_{70} \times 100$). For example, when the mineral is kaolin, the steepness factor may be about 20 to about 45.

The particles of the inorganic mineral usable in the present invention may have a specific surface area (as measured by the BET liquid nitrogen absorption method ISO 5794/1) of greater than about 10 $m^2g^{-1}$, or greater than about 20 $m^2g^{-1}$, or greater than about 30 $m^2g^{-1}$. The surface area may be equal to or less than about 50 $m^2g^{-1}$. For example, the particles of the inorganic mineral may range from about 10 $m^2g^{-1}$ to about 50 $m^2g^{-1}$, or from about 20 $m^2g^{-1}$ to about 50 $m^2g^{-1}$, or from about 30 $m^2g^{-1}$ to about 50 $m^2g^{-1}$. Advantageously, the modulus and strength of the coatings may be increased by the inorganic mineral possessing a high surface area.

The coating composition typically comprises up to about 25 wt %, for example up to about 20 wt % of the mineral based on the total weight of the clear composition. The coating composition may comprise at least about 2 wt %, for example at least about 5 wt %, for example at least about 10 wt % or at least about 15 wt % of the mineral based on the total weight of the clear composition. The coating composition may comprise about 5 wt % to about 25 wt % of the mineral based on the total weight of the clear composition, for example, about 5 wt % to about 20 wt %, for example about 5 wt % to about 15 wt %. The coating composition may comprise about 2 wt % to about 25 wt % of the mineral based on the total weight of the clear composition, for example, about 2 wt % to about 20 wt %, for example about 2 wt % to about 15 wt %.

Advantageously, the mineral or minerals for use in the coating composition are free or essentially free of high refractive index contaminants. Examples of such contaminants include $TiO_2$ and $Fe_2O_3$. The amount of titanium (expressed as wt % of $TiO_2$) may be less than 0.1. The amount of iron (expressed as wt % of $Fe_2O_3$) may be less than 1. The refractive index of the mineral or minerals may advantageously be matched or closely matched to that of the remainder of the clear coating composition.

Articles/Substrates

The clear coating composition is suitable for application on a range of articles or substrates. Suitable substrates include wood, plastic, metal. Methods for coating the articles are known to the skilled person and include brushing and spraying.

BRIEF DESCRIPTION OF THE DRAWINGS

Embodiments of the invention will now be described by way of example only and without limitation, with reference to the accompanying drawings and the following Examples, in which.

EXAMPLES

Example 1

Coatings in accordance with the invention were prepared in two different types of UV-curable urethane acrylate resin according to the following procedure.

1. A suitable quantity of dispersant was dissolved into hexanediol diacrylate (HDDA) before adding powdered mineral and mixed under high shear in order to prepare a dispersion at approximately 50 wt % mineral.
2. A coating formulation was prepared by mixing at high shear suitable quantities of UV-curable urethane acrylate resin, hexanedioldiacrylate, photoinitiator and the mineral dispersion from step (1).
3. Coatings of 130 μm, 400 μm or 600 μm thickness were prepared from the formulations using a standard drawdown procedure in which a sample of the coating was placed on a glass or polypropylene substrate in front of either a wire-wrapped cylindrical bar (130 μm coatings) or a rectangular-sectioned bar with a well-defined rebate cut into it (400 μm and 600 μm coatings). The bar was then drawn over the sample in order to produce a layer of constant thickness.
4. The coated substrate was then irradiated with UV light using a Primarc Minicure curing system, with an 80 W/cm Hg lamp and a belt speed of 5 m/min. Complete curing of the resin was verified using ATR/FTIR spectroscopy. The absorption peaks associated with the carbon carbon double bonds in the acrylate groups are not present in the spectra of the cured films. For the thicker films (400 μm and 600 μm coatings) each sample was passed through the curing device up to three times in order to ensure the curing was complete.
5. Coatings were peeled from the substrate for measurement of mechanical and optical properties.

Compositions of the coatings comprising ultrafine platey kaolin, halloysite or coarse kaolin in the hard resin based upon Desmolux U680H are given in Table 1. The same procedure was used for coatings comprising a nanoalumina. However, since the nanoalumina (NanoByk 3602, Altana) was supplied as a 30 wt % dispersion in hexanedioldiacrylate, the total amount of this dispersion used in each case is shown in Table 2. Similarly, compositions of coatings made in the flexible resin based upon Desmolux U100 are given in Table 3 and Table 4. In Tables 1 to 4, all constituents are present in grams (g). In Tables 1 and 3, the amount of Solsperse 32000 present when the filler was coarse kaolin is shown in brackets. Desmolux U680H and 0100 are commercially available from Bayer.

Minerals

NanoByk 3602 was used as received from Altana, (www.nanobyk.com). It is a 30 wt % dispersion of alumina nanoparticles in hexanediol diacrylate, with a reported mean particle size of 40 nm.

The ultrafine platey kaolin was characterized by Sedigraph and by disc centrifuge. For nanoparticles, measurement of size by sedimentation is widely practised using a disc centrifuge device (e.g. CPS disc centrifuge, www.cpsinstruments.eu). This uses a centrifugal field to amplify the sedimentation rate and eliminate interference of Brownian motion in the measurement. Particle size distributions of the ultrafine platey kaolin by Sedigraph and disc centrifuge methods are given in Table A. The halloysite particle size was characterised by Sedigraph. The particle size distribution is given in Table B. The coarse kaolin was characterised by Sedigraph and the particle size distribution is given in Table C.

TABLE A

| Ultrafine kaolin | | |
|---|---|---|
| Equivalent spherical diameter/μm | Wt % below (Sedigraph) | Wt % below (disc centrifuge) |
| 2 | 99.2 | 99.2 |
| 1 | 98.6 | 99.1 |
| 0.5 | 93.7 | 94.5 |
| 0.25 | 60.2 | 45.0 |
| 0.1 | 21.4 | 3.9 |
| Median size ($d_{50}$)/μm | 0.21 | 0.27 |
| BET Surface Area/$m^2g^{-1}$ | 31.8 | |

TABLE B

| Halloysite | |
|---|---|
| Equivalent spherical diameter/μm | Wt % below (Sedigraph) |
| 2 | 99 |
| 1 | 98 |
| 0.5 | 90 |
| 0.25 | 56 |
| 0.1 | 21 |
| Median size ($d_{50}$)/μm | 0.22 |
| BET Surface Area/$m^2g^{-1}$ | 30.4 |

TABLE C

| Coarse kaolin | |
|---|---|
| Equivalent spherical diameter/μm | Wt % below (Sedigraph) |
| 10 | 97.4 |
| 5 | 74.5 |
| 2 | 18.5 |
| 1 | 7.8 |
| 0.5 | 4.5 |
| 0.25 | 3 |
| 0.1 | 1.4 |
| Median size ($d_{50}$)/μm | 3.54 |
| BET Surface Area/$m^2g^{-1}$ | 4.5 |

TABLE 1

Compositions of coatings based upon Desmolux U680H containing ultrafine kaolin or halloysite or coarse kaolin

| Component | (Unfilled) | 2.5 wt % mineral | 5 wt % mineral | 10 wt % mineral | 15 wt % mineral |
|---|---|---|---|---|---|
| Desmolux U680H | 100 | 100 | 100 | 100 | 100 |
| Hexanediol diacrylate | 61.1 | 61.1 | 61.1 | 61.1 | 61.1 |
| Irgacure 184 | 4.84 | 4.84 | 4.84 | 4.84 | 4.84 |
| Mineral | — | 4.25 | 8.73 | 18.4 | 29.27 |
| Solsperse 32000 | — | 0.26 [0.04] | 0.52 [0.09] | 1.11 [0.18] | 1.76 [0.29] |

TABLE 2

Compositions of coatings based upon Desmolux U680H containing nanoalumina (Nanobyk 3602)

| Component | 0.5 wt % Nano-alumina | 1.0 wt % Nano-alumina | 1.5 wt % Nano-alumina | 2.5 wt % Nano-alumina | 5 wt % Nano-alumina | 10 wt % Nano-alumina |
|---|---|---|---|---|---|---|
| Desmolux U680H | 100 | 100 | 100 | 100 | 100 | 100 |
| Hexanediol diacrylate | 59.1 | 57.2 | 55.2 | 51.1 | 40.7 | 18.1 |
| Irgacure 184 | 4.84 | 4.84 | 4.84 | 4.84 | 4.84 | 4.84 |
| Nanobyk 3602 (30% dispersion in hexanediol diacrylate) | 2.86 | 5.57 | 8.43 | 14.29 | 29.14 | 61.45 |

TABLE 3

Compositions of coatings based upon Desmolux U100 containing ultrafine kaolin or halloysite or coarse kaolin

| Component | (Unfilled) | 5 wt % mineral | 15 wt % mineral |
|---|---|---|---|
| Desmolux U100 | 100 | 100 | 100 |
| Hexanediol diacrylate | 42.9 | 42.9 | 42.9 |
| Irgacure 184 | 3.66 | 3.66 | 3.66 |
| Mineral | — | 7.71 | 25.9 |
| Solsperse 32000 | — | 0.46 [0.08] | 1.55 [0.26] |

TABLE 4

Compositions of coatings based upon Desmolux U100 containing nanoalumina

| Component | 5 wt % Nanoalumina | 10 wt % Nanoalumina |
|---|---|---|
| Desmolux U100 | 100 | 100 |
| Hexanediol diacrylate | 24.9 | 4.9 |
| Irgacure 184 | 3.66 | 3.66 |
| Nanobyk 3602 (30% dispersion in hexanediol diacrylate) | 25.7 | 54.2 | a. Optical Properties

Figure 1:
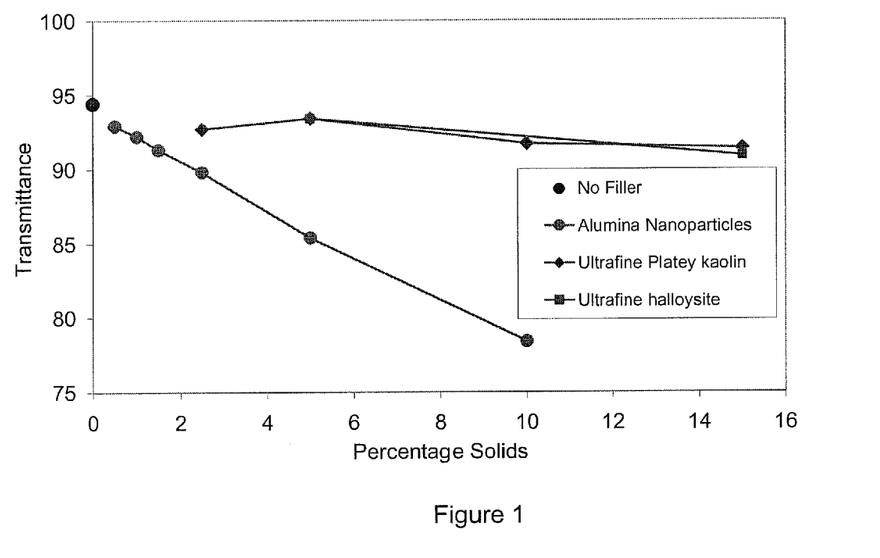
FIG. 1 shows the measured optical transmission of films as a function of filler loading formed from coatings in accordance with the present invention and films provided for the purposes of comparison.
Figure 2:
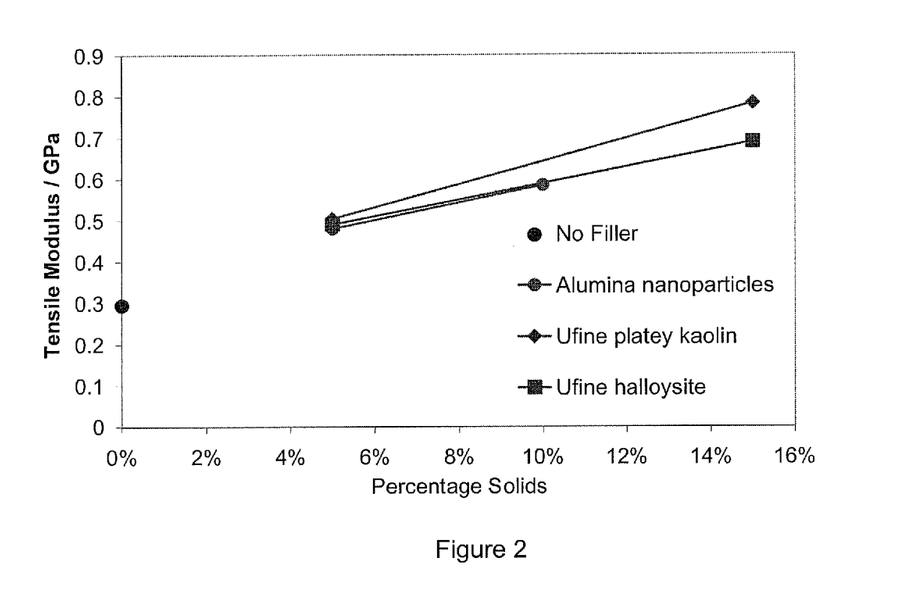
FIG. 2 shows the measured tensile modulus of films as a function of filler loading formed from coatings in accordance with the present invention and films provided for the purposes of comparison.
Figure 3:
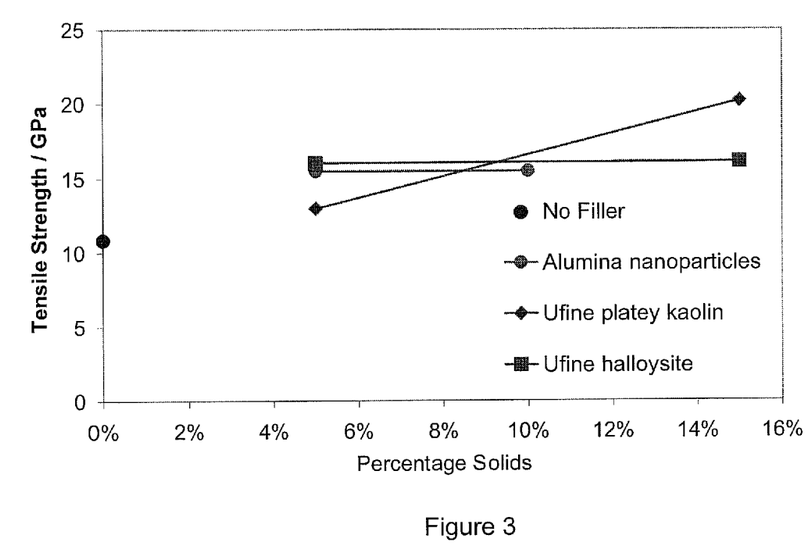
FIG. 3 shows the measured tensile strength of films as a function of filler loading formed from coatings in accordance with the present invention and films provided for the purposes of comparison.
Figure 4:
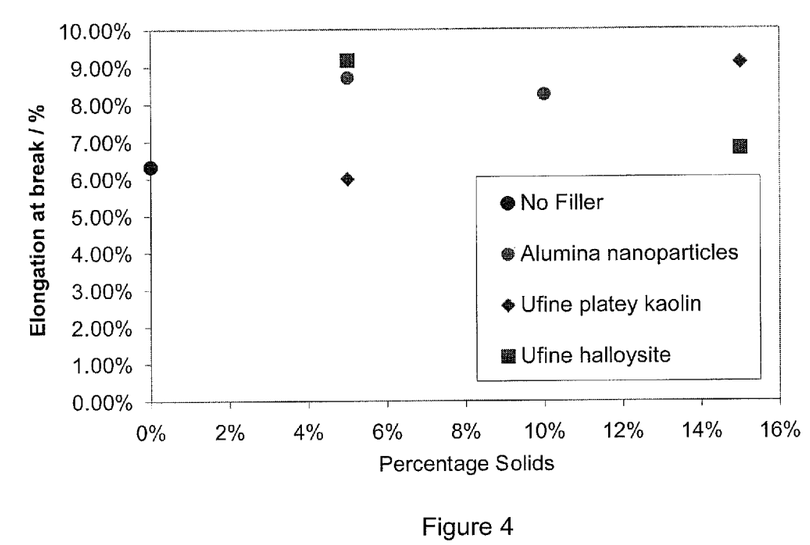
FIG. 4 shows the measured elongation at break of films as a function of filler loading formed from coatings in accordance with the present invention and films provided for the purposes of comparison.

The optical properties of 130 μm drawdown films of the formulations given in Table 1 and Table 2 were measured using a BydGardner Haze-Gard plus hazemeter (ASTM D1003). FIG. 1 and Table 5a show the optical transmittance as a function of filler loading. At 15 wt % loading of an ultrafine kaolin or halloysite the percentage transmission drops from the unfilled value of 94.4 to 91+/−0.5. By contrast, commercial alumina nanoparticles (NanoByk 3602) sold for this type of application reduce the transmission to 78.4% at a 10 wt % loading level. Tables 5b and 5c also show the haze and clarity values of the films. Even at 15 wt % loading, the reduction in clarity for both the kaolin and the halloysite is minimal. Tables 8 and 9 show the relative gloss measurements as a function of filler loading measured on a BykGardner Haze-Gloss instrument (ASTM D523). The gloss measurements were made on the 130 μm drawdown films of the formulations given in Tables 1 and 2 and relative to the unfilled control. The coatings were made on glass substrates and the gloss was measured without peeling off the films. The results indicate that a matting effect can be achieved without significantly compromising the transmittance.

TABLE 5a

| | Transmittance | | | |
|---|---|---|---|---|
| U680H resin Filler wt % | Nanobyk 3602 | Ultrafine kaolin | Halloysite | Coarse kaolin |
| 0 | 94.4 | 94.4 | 94.4 | 94.4 |
| 2.5 | 89.8 | | | 93.7 |
| 5 | 85.4 | 93.4 | 93.4 | 92 |
| 10 | 78.4 | 91.7 | | 91.2 |
| 15 | | 91.4 | 90.9 | 90.9 |

TABLE 5b

| | Haze | | | |
|---|---|---|---|---|
| U680H resin Filler wt % | Nanobyk 3602 | Ultrafine kaolin | Halloysite | Coarse kaolin |
| 0 | 4.29 | 4.29 | 4.29 | 4.29 |
| 2.5 | 10.5 | | | 25.4 |
| 5 | 11.3 | 2.23 | 17.7 | 72.9 |
| 10 | 41.7 | 17.4 | | 63.1 |
| 15 | | 19.6 | 35.8 | 79.3 |

TABLE 5c

| | Clarity | | | |
|---|---|---|---|---|
| U680H resin Filler wt % | Nanobyk 3602 | Ultrafine kaolin | Halloysite | Coarse kaolin |
| 0 | 98.4 | 98.4 | 98.4 | 98.4 |
| 2.5 | 98.3 | | | 81.4 |
| 5 | 98.4 | 96.6 | 96.8 | 48.8 |
| 10 | 98 | 91.5 | | 51.1 |
| 15 | | 90.6 | 93.9 | 38.8 | b. Tensile Properties

400 μm drawdown films of the coating formulations made in the flexible U100 resin described in Table 3 and Table 4 were made on a flat glass substrate and then carefully peeled off. They were then cut into 'dumbbell' shapes with 4 mm narrow sections and loaded onto a Tinius Olsen tensiometer for measurement of modulus, strength and elongation. For each formulation, at least six samples were measured, and the results shown are the average of these samples. Modulus was calculated from the gradient of stress versus strain at the origin (i.e. very low strain). The strength values shown are the average values of the stress at which the samples broke, and likewise the elongation at break values are the average of the strain at which the samples broke. The results are shown in Tables 6a-6c.

TABLE 6a

Modulus/GPa

| U100 resin Filler wt % | Nanobyk 3602 | Ultrafine kaolin | Halloysite | Coarse kaolin |
|---|---|---|---|---|
| 0 | 0.29 | 0.29 | 0.29 | 0.29 |
| 5 | 0.48 | 0.50 | 0.49 | 0.35 |
| 10 | 0.58 | | | |
| 15 | | 0.78 | 0.69 | 0.29 |

TABLE 6b

Strength/MPa

| U100 resin Filler wt % | Nanobyk 3602 | Ultrafine kaolin | Halloysite | Coarse kaolin |
|---|---|---|---|---|
| 0 | 10.9 | 10.9 | 10.9 | 10.9 |
| 5 | 15.5 | 13.0 | 16.0 | 13.4 |
| 10 | 15.5 | | | |
| 15 | | 20.2 | 16.1 | 14.1 |

TABLE 6c

Elongation/%

| U100 resin Filler wt % | Nanobyk 3602 | Ultrafine kaolin | Halloysite | Coarse kaolin |
|---|---|---|---|---|
| 0 | 6.3 | 6.3 | 6.3 | 6.3 |
| 5 | 8.7 | 6.0 | 9.2 | 6.0 |
| 10 | 8.2 | | | |
| 15 | | 9.1 | 6.8 | 10.5 | c. Film Hardness

600 μm drawdown films of the coating formulations made in the hard U680H resin described in Tables 1 and 2 were made on a flat glass substrate and then carefully peeled off. These were then placed in stacks of three to make a total thickness of 1.8 mm, and their indentation (Barcol) hardness measured with a Barber-Colman impressor (ASTM D2583-75). After applying pressure to the instrument the reading was allowed to stabilize for 30 seconds before recording. The results are shown in Table 7.

TABLE 7

Barcol indentation hardness (30 sec) of filled UV-cure urethane acrylate (Desmolux U680H) films Indentation Hardness

| U680H resin Filler wt % | Nanobyk 3602 | Ultrafine kaolin | Halloysite | Coarse kaolin |
|---|---|---|---|---|
| 0 | 6.5 | 6.5 | 6.5 | 6.5 |
| 5 | 11.6 | 15.0 | 15.8 | 11.75 |
| 10 | 13.6 | | | |
| 15 | | 20.2 | 19.1 | 16.75 |

TABLE 8

Oblique Illumination (Gloss 20%)

| U680H resin Filler wt % | Nanobyk 3602 | Ultrafine kaolin | Halloysite | Coarse kaolin |
|---|---|---|---|---|
| 0 | 100 | 100 | 100 | 100 |
| 2.5 | 81 | | | 22 |
| 5.0 | 75 | 47 | 63 | 5 |
| 10 | 66 | 17 | | 6 |
| 15 | | 25 | 41 | 4 |

TABLE 9

Oblique Illumination (Gloss 60%)

| U680H resin Filler wt % | Nanobyk 3602 | Ultrafine kaolin | Halloysite | Coarse kaolin |
|---|---|---|---|---|
| 0 | 100 | 100 | 100 | 100 |
| 2.5 | 86 | 85 | | 49 |
| 5 | 77 | 72 | 81 | 27 |
| 10 | 69 | 46 | | 28 |
| 15 | | 52 | 65 | 26 |

Example 2

Coatings in accordance with the invention were prepared in a UV-curable urethane acrylate resin according to the following procedure.
1. A suitable quantity of dispersant was dissolved into the monomer formulation before adding powdered mineral and mixed under high shear in order to prepare a dispersion at approximately 50 wt % mineral.
2. A coating formulation was prepared by mixing at high shear, suitable quantities of UV-curable urethane acrylate resin, dipropylene glycol diacrylate (DPGDA), photoinitiator and the mineral dispersion from step (1). Samples were also prepared in the absence of dispersant in which case step (1) was not necessary and the powdered mineral was added without dispersant.
3. Coatings of 50 μm thickness were prepared from the formulations using a standard drawdown procedure in which a sample of the formulation was coated using a wire-wound bar onto either a clean glass plate or a sheet of medium density fibreboard (MDF), which had been pre-coated with a primer layer approximately 30 μm thick. The primer formulation for treatment of the MDF contained: Desmolux VP LS 2110 (74.50 wt %), Dipropylene Glycol Diacrylate (DPGDA) (22.50 wt %); and Irgacure 184 (3 wt %). Desmolux VP LS 2110 (formerly known as P175D), which is available from Bayer, is a hard, unsaturated polyester resin.

Compositions of the coatings comprising fine kaolin made in the flexible resin based upon Desmolux U100 are given in Table 10. The same procedure was used for coatings comprising a synthetic silica. In Tables 10 and 11, all constituents are present in grams (g). In Table 10, the amount of Solsperse 32000 present when the filler was fine kaolin is shown in brackets.

The rheology of each of the formulations were measured on a Bohlin Gemini rheometer (Malvern Instruments, Malvern, UK) using a 4° cone and plate geometry in rotational mode over the shear rate range 0.1 to 300 $s^{-1}$. Apparent viscosities at each end of the shear rate range are shown in Tables 10 and 11.

Minerals

Acematt OK412 was used as received from Evonik Degussa, Frankfurt, Germany. It is an organically surface treated silica with a reported $d_{50}$ of 6 µm suitable for use as a matting agent.

The fine kaolin was characterized by Sedigraph. Particle size distributions of the fine kaolin (Sedigraph) are given in Table D.

TABLE D

| Fine kaolin | |
|---|---|
| Equivalent spherical diameter/µm | Wt % below (Sedigraph) |
| 2 | 92 |
| 1 | 77 |
| 0.5 | 55 |
| 0.25 | 30 |
| 0.1 | 9 |
| Median size ($d_{50}$)/µm | 0.44 |
| BET Surface Area/m$^2$g$^{-1}$ | 16 |

TABLE 10

Compositions of coatings based upon Desmolux U100 containing fine kaolin

| Component | 5 wt % mineral | 10 wt % mineral | 5 wt % mineral | 10 wt % mineral |
|---|---|---|---|---|
| Desmolux U100 | 100 | 100 | 100 | 100 |
| Dipropylene Glycol Diacrylate (DPGDA) | 100 | 100 | 100 | 100 |
| Irgacure 184 | 6.19 | 6.18 | 6.21 | 6.19 |
| Mineral | 10.87 | 22.97 | 10.85 | 22.91 |
| Solsperse 32000 | [0.28] | [0.57] | 0.00 | 0.00 |
| Viscosity 0.1 s$^{-1}$ | 230 | 300 | 249 | 366 |
| Viscosity 300 s$^{-1}$ | 197 | 306 | 224 | 359 |

TABLE 11

Compositions of coatings based upon Desmolux U100 containing silica

| Component | 5 wt % silica | 10 wt % silica |
|---|---|---|
| Desmolux U100 | 100 | 100 |
| Dipropylene Glycol Diacrylate (DPGDA) | 100 | 100 |
| Irgacure 184 | 6.21 | 6.19 |
| Acematt OK412 | 10.85 | 22.91 |
| Viscosity 0.1 s$^{-1}$ | 370 | 3340 |
| Viscosity 300 s$^{-1}$ | 288 | 706 | a. Optical Properties

The relative gloss of 50 µm drawdown films of the formulations given in Tables 10 and 11 on separate glass and medium density fibre board (MDF) substrates were measured on a BykGardner Haze-Gloss instrument (ASTM D523). The gloss measurements were made on the 50 µm drawdown films of the formulations given in Tables 10 and 11 and relative to an unfilled control. The gloss was measured without peeling off the films. The results indicate that a significant matting effect is achieved by using kaolin when compared to the commercially available mineral comprising the synthetic silica. Further improvements in matting were also achieved by the use of a dispersant with the kaolin.

TABLE 12

| Oblique Illumination (Gloss 20%) | | | | |
|---|---|---|---|---|
| U100 resin Filler wt % | Substrate | Acematt OK412 | Fine kaolin without dispersant | Fine kaolin with dispersant | No Filler |
| 0 | glass | — | — | — | 88.1 |
| 5 | glass | 39 | 29 | 13 | — |
| 10 | glass | 26 | 13 | 7 | — |
| 0 | MDF | — | — | — | 76 |
| 5 | MDF | 12 | 10 | 4 | — |
| 10 | MDF | 10 | 5 | 3 | — |

TABLE 13

| Oblique Illumination (Gloss 60%) | | | | |
|---|---|---|---|---|
| U100 resin Filler wt % | Substrate | Acematt OK412 | Fine kaolin without dispersant | Fine kaolin with dispersant | No Filler |
| 0 | glass | — | — | — | 91.9 |
| 5 | glass | 75 | 65 | 50 | — |
| 10 | glass | 66 | 49 | 39 | — |
| 0 | MDF | — | — | — | 87 |
| 5 | MDF | 52 | 47 | 32 | — |
| 10 | MDF | 48 | 33 | 26 | — |

TABLE 14

| Oblique Illumination (Gloss 85%) | | | | |
|---|---|---|---|---|
| U100 resin Filler wt % | Substrate | Acematt OK412 | Fine kaolin without dispersant | Fine kaolin with dispersant | No Filler |
| 0 | glass | — | — | — | 100 |
| 5 | glass | 97 | 95 | 91 | — |
| 10 | glass | 96 | 92 | 88 | — |
| 0 | MDF | — | — | — | 97 |
| 5 | MDF | 89 | 87 | 75 | — |
| 10 | MDF | 88 | 83 | 77 | — |

Example 3

Coatings in accordance with the invention were prepared in a range of UV-curable urethane acrylate resins according to the following procedure.
1. A coating formulation was prepared by mixing at high shear, suitable quantities of UV-curable urethane acrylate resin, dipropylene glycol diacrylate (DPGDA), hexanediol diacrylate (HDDA,) photoinitiator and the halloysite in accordance with Table B.
2. Coatings of 100 µm thickness were prepared from single formulations using a pilot-scale roll coater onto a medium density fibreboard (MDF) substrate. A layer of approximately 33 µm was applied to the substrate, which was then cured by irradiation with UV light with an 80 W/cm Hg lamp at a belt speed of 5 m/min. Two further coatings were then applied and cured in the same way to give a total thickness of 100 µm. The abrasion resistance of the coated MDF was measured in accordance with the Grit Feeder Test (EN 14354, Annex D) which measures the number of revolutions of an abrader required to destroy the coating. The results are presented in Tables 19 to 22. Sanding of the primer and sealer layers is an important step in the production of wood coatings, and so a manual assessment of the ease of sanding of the coatings was made and is also included in the tables.

3. Multilayer coatings onto oak parquet flooring were made from combinations of the formulations using the same pilot-scale roll coater. Firstly, a 20 μm thick layer of a primer consisting of Desmolux D200 was applied and cured by irradiating with UV light with an 80 W/cm Hg lamp and a belt speed of 5 m/min. Desmolux D200 is an isocyanate-bearing urethane acrylate, available from Bayer. This was followed by 3 layers, each of 20 μm thickness, of a sealer formulation in accordance with Table 16. Each layer was cured in the same way before the next coating was applied. This was followed by the application of a topcoat formulation in accordance with Table 18 of 12 μm thickness which was subsequently cured. The abrasion resistance was measured according to two tests: the Grit Feeder Test (EN 14354, Annex D), and the Taber S42 Test (EN 13329, Annex E), both of which measure the number of revolutions of an abrader required to destroy the coating. In addition, the impact resistance was measured using a large diameter ball impact test (EN 14354, Annex C). The results are provided in Table 23.

Compositions of the coatings comprising halloysite in resin based upon various Desmolux resins (commercially available from Bayer) are given in Tables 15 to 18. In Tables 15 to 18, all constituents are present in grams (g). Desmolux XP2738 is an unsaturated aliphatic allophanate urethane acrylate. Desmolux XP2744 is an unsaturated polyester acrylate. Desmolux VP LS2299 is an unsaturated amine-modified polyether acrylate.

TABLE 15

Compositions of coatings based upon Desmolux XP2738 containing halloysite

| Component | 0 wt % mineral | 8.77 wt % mineral | 12.61 wt % mineral |
|---|---|---|---|
| Desmolux XP2738 | 60 | 60 | 60 |
| Hexanediol diacrylate (HDDA) | 40 | 40 | 40 |
| Darocur 1173 | 3 | 3 | 3 |
| Mineral | 0 | 10 | 15 |
| Solsperse 32000 | 1 | 1 | 1 |
| Viscosity/cP | 350 | 380 | 400 |

TABLE 16

Compositions of coatings based upon Desmolux U100 containing halloysite

| Component | 0 wt % mineral | 8.77 wt % mineral | 12.61 wt % mineral |
|---|---|---|---|
| Desmolux U100 | 70 | 70 | 70 |
| Dipropylene Glycol Diacrylate (DPGDA) | 30 | 30 | 30 |
| Darocur 1173 | 3 | 3 | 3 |
| Mineral | 0 | 10 | 15 |
| Solsperse 32000 | 1 | 1 | 1 |
| Viscosity/cP | 600 | 850 | 900 |

TABLE 17

Compositions of coatings based upon Desmolux XP2744 containing halloysite

| Component | 0 wt % mineral | 8.77 wt % mineral | 12.61 wt % mineral |
|---|---|---|---|
| Desmolux XP2744 | 70 | 70 | 70 |
| Dipropylene Glycol Diacrylate (DPGDA) | 30 | 30 | 30 |
| Darocur 1173 | 3 | 3 | 3 |
| Mineral | 0 | 10 | 15 |
| Solsperse 32000 | 1 | 1 | 1 |
| Viscosity/cP | 500 | 750 | 800 |

TABLE 18

Compositions of coatings based upon Desmolux U100 and Desmolux VP LS2299 containing halloysite

| Component | 0 wt % mineral | 8.77 wt % mineral | 12.61 wt % mineral |
|---|---|---|---|
| Desmolux U100 | 55 | 55 | 55 |
| Desmolux VP LS2299 | 25 | 25 | 25 |
| Dipropylene Glycol Diacrylate (DPGDA) | 20 | 20 | 20 |
| Darocur 1173 | 3 | 3 | 3 |
| Mineral | 0 | 10 | 15 |
| Solsperse 32000 | 1 | 1 | 1 |
| Viscosity/cP | 650 | 900 | 1000 |

TABLE 19

| XP2738 resin | Grit Feeder Test (MDF substrate) | |
|---|---|---|
| Filler wt % | Sanding | Revs/100 μm |
| 0 | Good | 2000 |
| 8.77 | Very good | 2000 |
| 12.61 | Very good | 2200 |

TABLE 20

| U100 resin | Grit Feeder Test (MDF substrate) | |
|---|---|---|
| Filler wt % | Sanding | Revs/100 μm |
| 0 | Good | 4100 |
| 8.77 | Very good | 3900 |
| 12.61 | Very good | 4100 |

TABLE 21

| XP2744 resin | Grit Feeder Test (MDF substrate) | |
|---|---|---|
| Filler wt % | Sanding | Revs/100 μm |
| 0 | Good | 2000 |
| 8.77 | Very good | 2300 |
| 12.61 | Very good | 2400 |

TABLE 22

| U100 + VP LS2299 resin | Grit Feeder Test (MDF substrate) | |
|---|---|---|
| Filler wt % | Sanding | Revs/100 μm |
| 0 | Good | 2000 |
| 8.77 | Very good | 2000 |
| 12.61 | Very good | 2200 |

TABLE 23

| | Mechanical test (Parquet) | | |
|---|---|---|---|
| Filler wt % | Taber S42 Revs/100 μm | Grit Feeder Revs/100 μm | Impact Height/mm |
| 0 | 200 | 4200 | 1000 |
| 8.77 | 250 | 4200 | 1000 |
| 12.61 | 250 | 4100 | 1100 |

The invention claimed is:

1. A clear coating composition comprising a particulate inorganic mineral, wherein the $d_{50}$ of the particulate inorganic mineral is less than about 1 μm, the wt % of the particulate inorganic mineral less than 0.1 μm as measured according to the disc centrifuge method is 40 wt % or less, and wherein the mineral comprises a kandite clay, and the particulate inorganic mineral has a steepness factor that ranges from about 20 to about 75, and
   wherein the coating composition has a transmittance greater than about 90% when the coating composition comprises up to about 25 wt % of the mineral based on the total weight of the coating composition.

2. The clear coating composition according to claim 1, wherein the kandite clay is at least one of kaolin or halloysite.

3. The clear coating composition according to claim 1, wherein the wt % of particulate inorganic mineral less than 0.1 μm as measured according to the disc centrifuge method is 10 wt % or less.

4. The clear coating composition according to claim 1, wherein the wt % of particulate inorganic mineral less than 0.1 μm as measured according to the disc centrifuge method is 20 wt % or less.

5. The clear coating composition according to claim 1, wherein the wt % of particulate inorganic mineral less than 0.1 μm as measured according to the disc centrifuge method is 5 wt % or less.

6. The clear coating composition according to claim 1, wherein the wt % of particulate inorganic mineral less than 0.1 μm as measured according to the disc centrifuge method is 1 wt % or less.

7. The clear coating composition according to claim 1, wherein the wt % of particulate inorganic mineral less than 0.1 μm as measured according to the disc centrifuge method is at least about 0.1 wt %.

8. The clear coating composition according to claim 1, wherein the $d_{50}$ of the particulate inorganic mineral is less than about 0.6 μm.

9. The clear coating composition according to claim 1, wherein the $d_{50}$ of the particulate inorganic mineral is less than about 0.5 μm.

10. The clear coating composition according to claim 1, wherein the $d_{50}$ of the particulate inorganic mineral is less than about 0.4 μm.

11. The clear coating composition according to claim 1, wherein the $d_{50}$ of the particulate inorganic mineral is at least about 0.15 μm.

12. The clear coating composition according to claim 1, wherein the aspect ratio of the particulate inorganic mineral is greater than about 10.

13. The clear coating composition according to claim 1, wherein the aspect ratio of the particulate inorganic mineral is greater than about 30.

14. The clear coating composition according to claim 1, wherein the aspect ratio of the particulate inorganic mineral ranges from about 10 to about 70.

15. The clear coating composition according to claim 14, wherein the aspect ratio of the particulate inorganic mineral ranges from about 20 to about 50.

16. The clear coating composition according to claim 1, wherein the mineral is kaolin and the steepness factor ranges from about 20 to about 45.

17. The clear coating composition according to claim 1, wherein the coating composition comprises a polymer resin.

18. The clear coating composition according to claim 1, wherein the composition comprises an organic solvent.

19. The clear coating composition according to claim 1, wherein the composition is an aqueous based dispersion.

20. The clear coating composition according to claim 1, wherein the coating composition comprises up to about 20 wt % of the mineral based on the total weight of the clear composition.

21. The clear coating composition according to claim 1, wherein the coating composition comprises up to about 15 wt % of the mineral based on the total weight of the clear composition.

22. The clear coating composition according to claim 1, wherein the coating composition comprises at least about 2 wt % of the mineral based on the total weight of the clear composition.

23. The clear coating composition according to claim 1, wherein the coating composition comprises at least about 5 wt % of the mineral based on the total weight of the clear composition.

24. The clear coating composition according to claim 1, wherein the coating is a matt composition, and wherein the matt composition has a gloss (60°)<90 measured in accordance with ASTM D523.

25. The clear coating composition according to claim 24, wherein the matt composition has a gloss (60°)<80 measured in accordance with ASTM D523.

26. The clear coating composition according to claim 25, wherein the matt composition has a gloss (60°)<60 measured in accordance with ASTM D523.

27. The clear coating composition according to claim 26, wherein the matt composition has a gloss (60°)<50 measured in accordance with ASTM 0523.

28. The clear coating composition according to claim 24, wherein the matt composition has a gloss (60°)>5 measured in accordance with ASTM D523.

29. A production process for making the clear coating composition according to claim 1, the process comprising blending said mineral and other components of the clear coating composition.

30. A method for coating an article or substrate comprising:
   coating said article or substrate with the clear coating composition according to claim 1; and
   curing the coating composition.

31. An article or substrate coated with a clear coating composition according to claim 1.

32. The clear coating composition according to claim 1, wherein the particulate inorganic mineral has a BET surface area greater than about $10\ m^2g^{-1}$.

33. The clear coating composition according to claim 1, wherein the coating composition has a haze less than about 40.

* * * * *